(12) United States Patent
Yang et al.

(10) Patent No.: US 11,030,119 B2
(45) Date of Patent: Jun. 8, 2021

(54) STORAGE DATA ENCRYPTION AND DECRYPTION APPARATUS AND METHOD

(71) Applicant: C-SKY Microsystems Co., Ltd., Zhejiang (CN)

(72) Inventors: Jun Yang, Hangzhou (CN); Jie Wang, Hangzhou (CN)

(73) Assignee: C-SKY Microsystems Co., Ltd., Zhejiang (CN)

( * ) Notice: Subject to any disclaimer, the term of this patent is extended or adjusted under 35 U.S.C. 154(b) by 169 days.

(21) Appl. No.: 16/175,732

(22) Filed: Oct. 30, 2018

(65) Prior Publication Data

US 2019/0073319 A1 Mar. 7, 2019

Related U.S. Application Data

(63) Continuation of application No. PCT/CN2018/097717, filed on Jul. 30, 2018.

(30) Foreign Application Priority Data

Aug. 8, 2017 (CN) .......................... 201710671465.3

(51) Int. Cl.
*G06F 12/14* (2006.01)
*H04L 9/14* (2006.01)
(Continued)

(52) U.S. Cl.
CPC .......... *G06F 12/1408* (2013.01); *G06F 7/588* (2013.01); *G06F 21/602* (2013.01);
(Continued)

(58) Field of Classification Search
USPC ........ 713/193, 150, 163, 181; 726/2, 21, 36; 380/255, 264, 276
See application file for complete search history.

(56) References Cited

U.S. PATENT DOCUMENTS

2005/0177716 A1* 8/2005 Ginter ..................... G06F 21/10
713/157
2010/0211787 A1* 8/2010 Bukshpun ............... H04L 9/065
713/170
(Continued)

FOREIGN PATENT DOCUMENTS

CN 1830030 A 9/2006
CN 201054140 Y 4/2008
(Continued)

OTHER PUBLICATIONS

PCT International Search Report and Written Opinion dated Oct. 31, 2018, issued in corresponding International Application No. PCT/CN2018/097717 (13 pgs.).
(Continued)

*Primary Examiner* — Sharif E Ullah
(74) *Attorney, Agent, or Firm* — Finnegan, Henderson, Farabow, Garrett & Dunner, LLP

(57) ABSTRACT

The present disclosure provides a storage data encryption and decryption method, including: providing a true random number generator configured to generate a plurality of keys; providing a data memory configured to store data and a key memory configured to store keys, and writing the keys into the key memory; and providing a data reading and writing interface module configured to read and write data, and providing a data encryption and decryption module configured to read the keys and perform encryption and decryption operations. The data written by the data reading and writing interface module is encrypted by the data encryption and decryption module and written into the data memory. The data read from the data memory is decrypted by the data encryption and decryption module and read to the data reading and writing interface module.

27 Claims, 3 Drawing Sheets

(51) Int. Cl.
*G06F 21/79* (2013.01)
*G06F 7/58* (2006.01)
*G06F 21/60* (2013.01)
*H04L 9/08* (2006.01)

(52) U.S. Cl.
CPC ............ *G06F 21/79* (2013.01); *H04L 9/0894* (2013.01); *H04L 9/14* (2013.01)

(56) References Cited

U.S. PATENT DOCUMENTS

| | | | |
|---|---|---|---|
| 2011/0161655 A1* | 6/2011 | Gladwin | G06F 21/6218 713/150 |
| 2011/0182424 A1* | 7/2011 | Grube | G06F 3/0647 380/43 |
| 2013/0121488 A1 | 5/2013 | Kang et al. | |
| 2013/0136258 A1* | 5/2013 | Grube | H04L 67/306 380/44 |
| 2013/0275545 A1* | 10/2013 | Baptist | G06F 11/1076 709/215 |
| 2013/0275744 A1* | 10/2013 | Resch | H04L 63/0428 713/150 |
| 2013/0275776 A1* | 10/2013 | Baptist | H04L 9/0825 713/193 |
| 2014/0122902 A1 | 5/2014 | Isozaki et al. | |
| 2016/0072628 A1 | 3/2016 | DeBout et al. | |

FOREIGN PATENT DOCUMENTS

| | | |
|---|---|---|
| CN | 101582109 A | 11/2009 |
| CN | 102346820 A | 2/2012 |
| CN | 103931137 A | 7/2014 |
| CN | 104918243 A | 9/2015 |
| CN | 106599717 A | 4/2017 |
| CN | 106775971 A | 5/2017 |
| CN | 107516047 A | 12/2017 |
| WO | WO 03/027816 A1 | 4/2003 |
| WO | WO 2019/029393 A1 | 2/2019 |

OTHER PUBLICATIONS

European Patent Office Communication issued for Application No. 18841743 which encloses the extended European Search Report which includes pursuant to Rule 62 EPC, the Supplementary European Search Report (Art. 153(7) EPC) and the European search opinion, dated Jun. 22, 2020, 27 pages.
First Chinese Search Report issued in corresponding Chinese Application No. 201710671465.3 dated Mar. 25, 2019 (2 pages).
First Chinese Office Action issued in Chinese Application No. 201610973938.0 dated Apr. 2, 2019, 11 pages.
Xiaotong Zhang Wireless Sensor Network and Artificial Life,National Defense Industry Publication, pp. 1-4 (2008).
The extended European search report issued by European Patent Office corresponding the European Application No. 18842975.7, dated Mar. 30, 2021. (8 pages).

* cited by examiner

STORAGE DATA ENCRYPTION AND DECRYPTION APPARATUS AND METHOD

CROSS-REFERENCE TO RELATED APPLICATION

The present application claims priority to International Application No. PCT/CN2018/097717, filed on Jul. 30, 2018, which claims the benefits of priority to Chinese Patent Application No. 201710671465.3, filed on Aug. 8, 2017, both of which are incorporated herein by reference in their entireties.

TECHNICAL FIELD

The present disclosure relates to the field of computer devices and technologies, and in particular, to a storage data encryption and decryption apparatus and method.

BACKGROUND

With the acceleration of global informatization, networks and mobile Internet devices have been closely connected with people's lives and become indispensable carriers for information exchange in the modern society. With the dramatic improvement of the performance of mobile smart devices and the ever-expanding coverage of the high-speed mobile Internet, mobile office and mobile financial transactions have been carried out on a large scale. However, office data and financial transaction data are facing increasing threats.

The computer technologies, the cryptography theories, and the network application levels must be improved to solve the problem of data security. At present, information security protection has been developed from conventional single point information encryption to the construction of an information assurance system covering the whole network system on the basis of chip level hardware protection. In addition, designing chips with a low cost, a small volume, high performance, cracking-resistance, and an information security protection mechanism have become an inevitable trend. Thus, the chip design of a System on Chip (SoC) has gradually become a new direction of developing an embedded system. Chip designers usually integrate encryption and decryption algorithms and information security protocols in a SoC chip to ensure adequate security levels. However, the SoC chip integrated encryption and decryption algorithms in the conventional art encrypt and decrypt different chips or different storage areas of the same chip by using the same key, which cannot effectively protect data.

Therefore, it is urgent to design a storage data encryption and decryption apparatus and method, which can encrypt and decrypt data in different chips or different storage areas of the same chip by using different keys, thus implementing data storage, reading and writing operations more effectively.

SUMMARY

A storage data encryption and decryption apparatus and method provided in the present disclosure can encrypt and decrypt data in different chips or different storage areas of the same chip by using different keys, so as to overcome the shortcomings in the prior art, thus implementing data storage, reading and writing operations more efficiently.

According to some embodiments of the present disclosure, there is provided a method for encrypting and decrypting data. The method is performed by an embedded system. The method includes generating, by a true random number generator of the embedded system, a plurality of keys. The method also includes writing the plurality of keys into a key memory of the embedded system. The method further includes performing encryption and decryption operations using at least one key of the plurality of keys from the key memory. The at least one key is used to encrypt acquired data to be written to a data memory of the embedded system and to decrypt encrypted data read from the data memory.

According to some embodiments of the present disclosure, there is provided an embedded system for encrypting and decrypting data. The embedded system includes a true random number generator configured to generate a plurality of keys. The embedded system also includes a memory bank having a key memory configured to store the plurality of keys. The embedded system further includes a memory module configured to use at least one key of the plurality of keys from the key memory to perform encryption and decryption operations. The at least one key is used to encrypt acquired data to be written to a data memory of the embedded system and to decrypt encrypted data read from the data memory.

The storage data encryption and decryption apparatus and method provided in embodiments of the present disclosure can implement encryption of data in different chips or different storage areas of the same chip in a clock cycle, thus implementing data storage, reading and writing operations securely and efficiently.

BRIEF DESCRIPTION OF THE DRAWINGS

To illustrate the technical solutions in the embodiments of the present disclosure more clearly, the accompanying drawings for describing the embodiments are introduced briefly in the following. It is apparent that the accompanying drawings in the following description depict only some embodiments of the present disclosure. Those of ordinary skill in the art can obtain other drawings according to the accompanying drawings without creative efforts.

DETAILED DESCRIPTION

In order to illustrate the objectives, technical solutions, and advantages of the embodiments of the present disclosure, the technical solutions in the embodiments of the present disclosure are described in the following with reference to the accompanying drawings depicting some embodiments of the present disclosure. It is apparent that the embodiments described are merely some of rather than all the embodiments of the present disclosure. Based on the embodiments described below, all other embodiments obtained by those of ordinary skill in the art without creative efforts shall be encompassed in the protection scope of the present disclosure.

Figure 1:
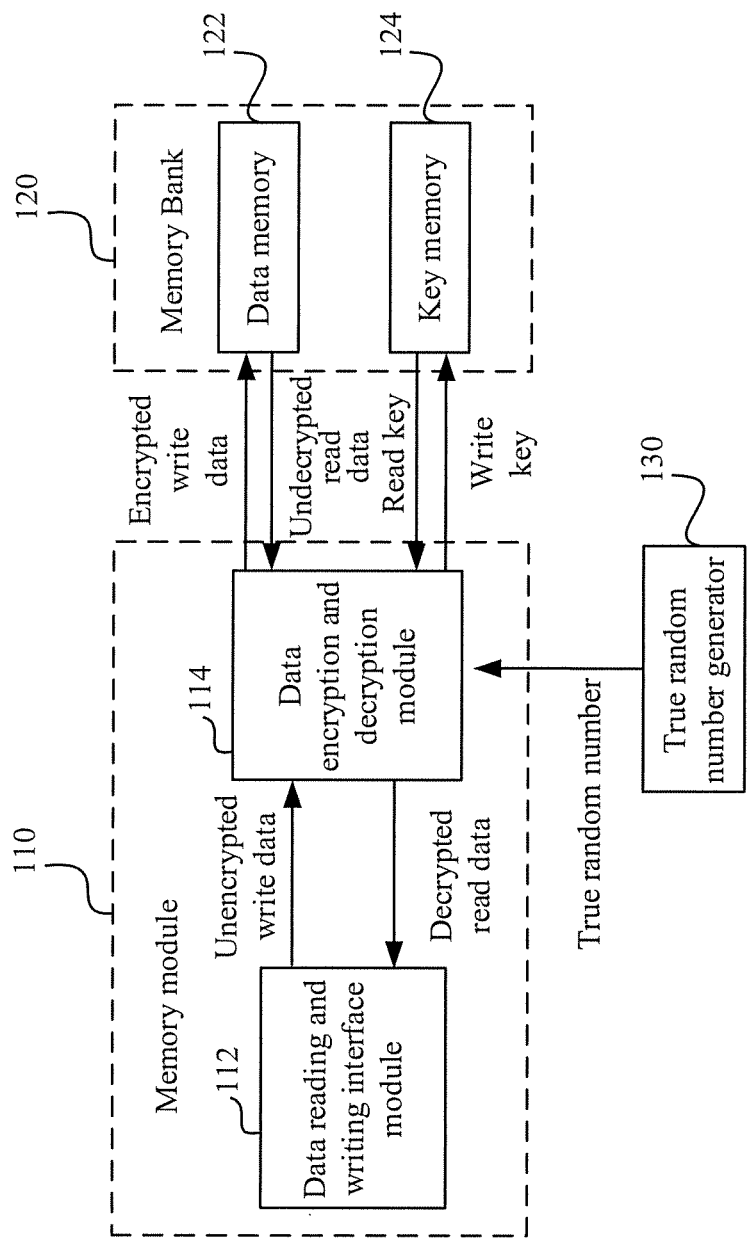
FIG. 1 is a schematic diagram of an exemplary storage data encryption and decryption apparatus according to some embodiments of the present disclosure.

The present disclosure provides a storage data encryption and decryption apparatus. FIG. 1 is a schematic diagram of an exemplary storage data encryption and decryption apparatus according to some embodiments of the present disclosure. As shown in FIG. 1, the storage data encryption and decryption apparatus includes a memory module 110, a memory bank 120, and a true random number generator 130. Specifically, memory module 110 is configured to support data and key reading and writing and perform encryption and decryption operations on data passing through the module. Memory bank 120 is configured to support a data and key storage function. True random number generator 130 is configured to generate keys.

Memory module 110 is responsible for encrypting write data and writing the encrypted write data into memory bank 120, and decrypting read data that is read from memory bank 120. The memory module 110 includes a data reading and writing interface module 112 and a data encryption and decryption module 114. Data reading and writing interface module 112 is configured to read and write data. Data encryption and decryption module 114 is configured to encrypt and decrypt the data.

Specifically, the data reading and writing interface module outputs unencrypted write data to the data encryption and decryption module, and inputs decrypted read data from the data encryption and decryption module.

In particular, the data encryption and decryption module can use single-cycle encryption and decryption algorithms. Such single-cycle encryption and decryption algorithms can include, but are not limited to, exclusive OR encryption, sequence rearrangement, and the like. The data encryption and decryption module using such encryption and decryption algorithms does not affect the efficiency of data access.

Memory bank 120 can include a data memory 122 and a key memory 124. The data memory is configured to store data. The key memory is configured to store keys. Typically, the data memory and the key memory are deployed, but are not limited to being deployed, on the same physical storage medium, thus facilitating efficient implementation of storage.

Specifically, the data in the data memory can be divided into a plurality of data storage areas. Encryption and decryption can be performed on different storage areas by using different keys. Each storage area can be selected to allow encryption and decryption to be performed on the selected storage area. However, data in the same storage area may only be encrypted and decrypted by using the same key. In addition, keys used in the same data storage area of different chips can also be different. Keys used for performing encryption and decryption operations on the data of the entire data storage area of different chips can be different from each other. A plurality of keys are stored in the key memory and are respectively used for performing encryption and decryption operations on data in particular data storage areas.

The true random number generator is responsible for generating keys that are provided to the data encryption and decryption module for performing encryption and decryption operations on data.

Specifically, the data encryption and decryption module in the memory module outputs true random numbers generated by the true random number generator as keys into the key memory of the memory bank. The data encryption and decryption module encrypts write data output into the data memory by using the keys in the key memory, and decrypts input read data.

In particular, the data encryption and decryption module automatically acquires the keys in the key memory of the memory bank when a chip is started, and encrypts and decrypts, by using the acquired keys, all data passing through the memory module. The manner of acquiring the keys is implemented by hardware, and is software-transparent.

In particular, the memory module can be accessed after the data encryption and decryption module completes acquisition of the keys, and no response may be made to an advanced access request.

Figure 2:
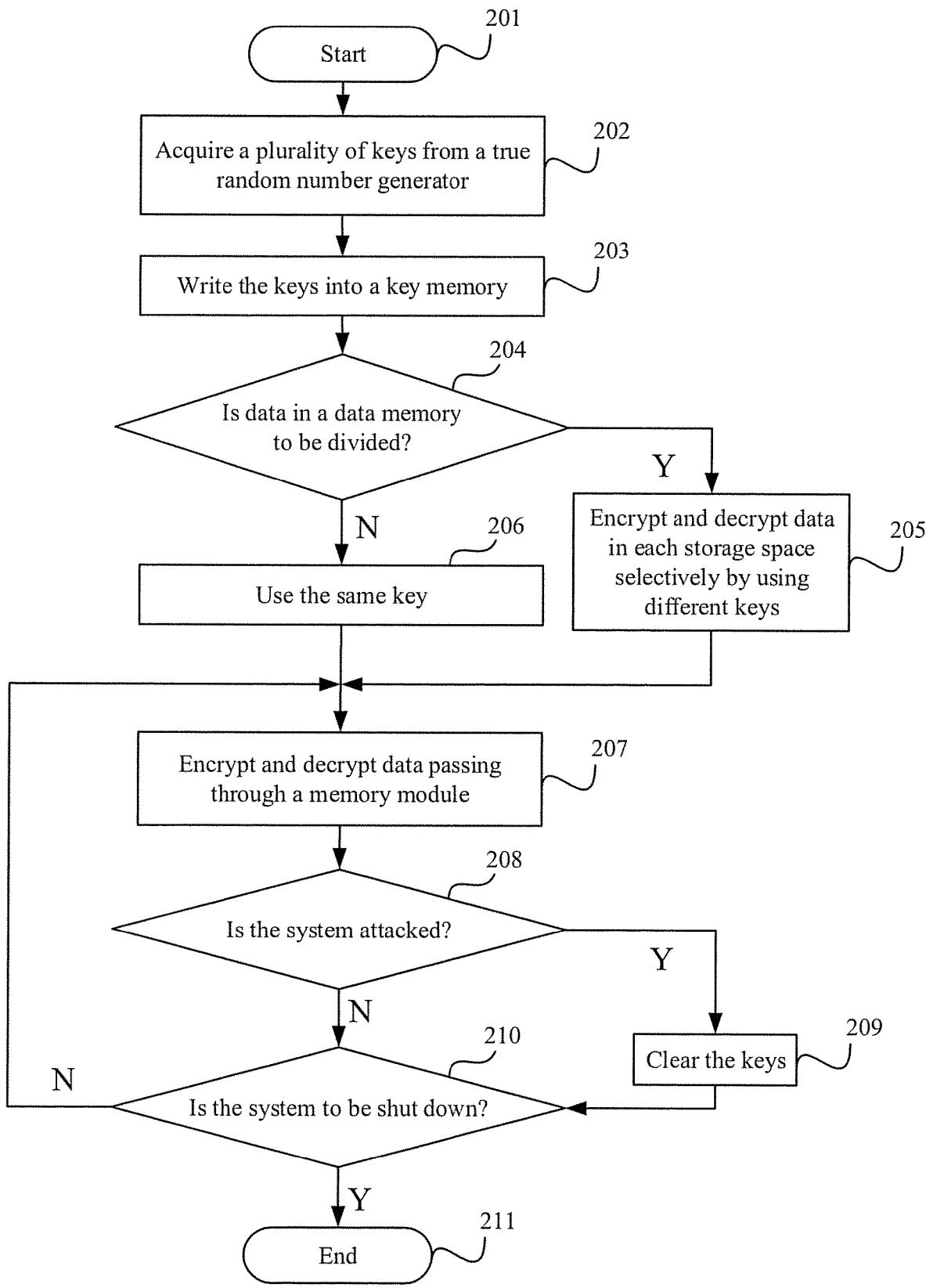
FIG. 2 is a flowchart of an exemplary method for performing storage data encryption and decryption according to some embodiments of the present disclosure.

FIG. 2 is a flowchart of an exemplary method for performing storage, data encryption and decryption according to some embodiments of the present disclosure. The method can be performed by a storage data encryption and decryption apparatus of FIG. 1. As shown in FIG. 2, in step 201, the method is started. In step 202, the apparatus can acquire a plurality of keys generated by a true random number generator. In step 203, the apparatus (e.g., using a data encryption and decryption module) writes the keys generated by the true random number generator into a key memory.

At step 204, the apparatus determines whether data in a data memory is to be divided. If it is determined that the data in the data memory is to be divided, at step 205, the data memory is logically partitioned into a plurality of data storage areas, and encryption and decryption operations are performed selectively on data of each data storage area by using a different key. On the other hand, if it is determined that the data in the data memory is not to be divided, at step 206, the data memory is not partitioned into data storage areas, and data encryption and decryption are performed on an entire data storage area by using a unified key.

In step 207, after either of steps 205 and 206, the apparatus encrypts and decrypts the data passing through the memory module. In some embodiments of the present disclosure, a data reading and writing interface module transmits unencrypted write data to the data encryption and decryption module, and the data encryption and decryption module encrypts the data and then stores the encrypted data into the data memory. On the other hand, the data memory transmits undecrypted read data to the data encryption and decryption module, and the data encryption and decryption module decrypts the undecrypted read data and transmits decrypted read data to the data reading and writing interface module. Then, at step 208, it is determined whether the system is attacked. If the system is attacked, at step 209, the data encryption and decryption module clears the keys in the key memory so as to avoid the data in the memory from being attacked and acquired. If the system is not attacked, it is determined whether the system is to be shut down at step 210. If it is determined that the system is not to be shut down, the data passing through the memory module is encrypted and decrypted (e.g., step 207). If it is determined that the system is to be shut down, at step 211, the system is started.

Figure 3:
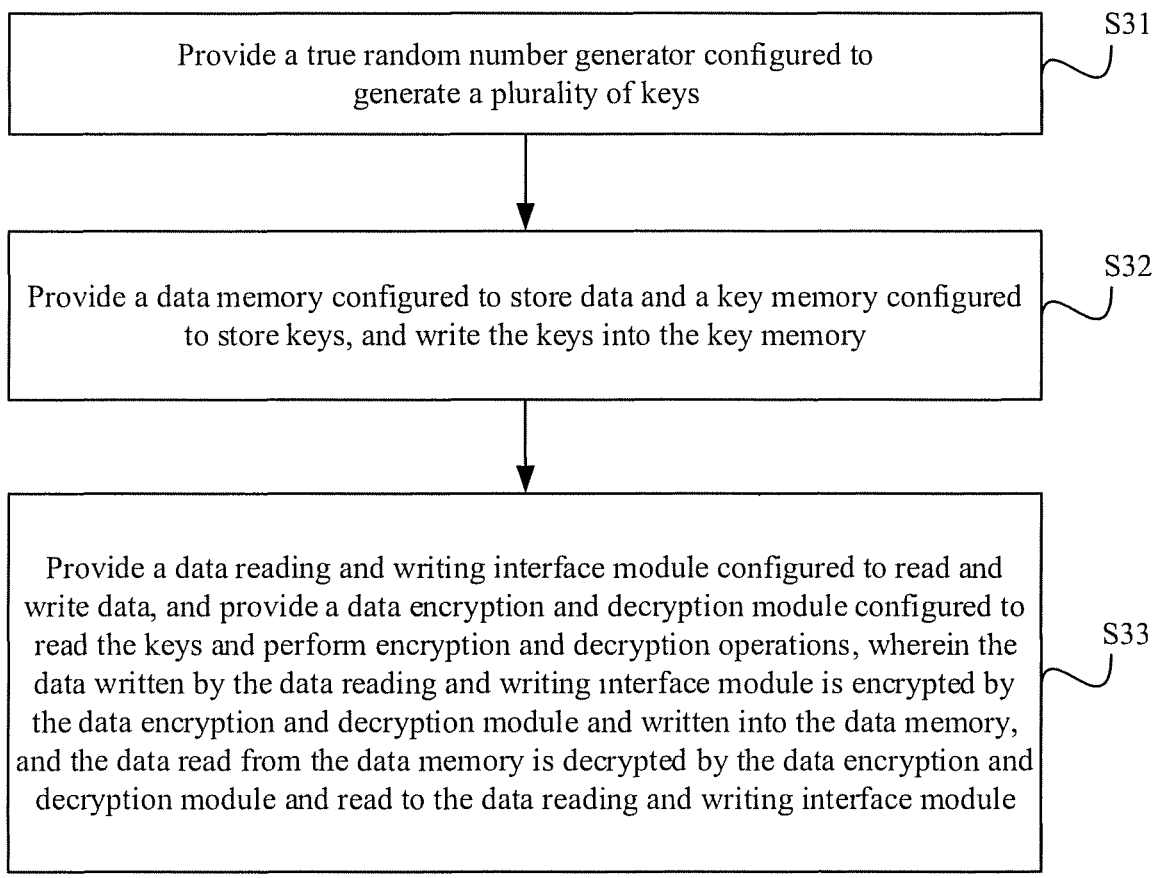
FIG. 3 is a schematic diagram of an exemplary storage data encryption and decryption method according to some embodiments of the present disclosure.

FIG. 3 is a schematic diagram of an exemplary storage data encryption and decryption method according to some embodiments of the present disclosure. As shown in FIG. 3, in step S31, a true random number generator configured to generate a plurality of keys is provided. In step S32, a data memory configured to store data and a key memory configured to store keys are provided, and the keys are written into the key memory. In step S33, a data reading and writing interface module configured to read and write data is provided, and a data encryption and decryption module configured to read the keys and perform encryption and decryption operations is provided. The data written from the data reading and writing interface module is encrypted by the data encryption and decryption module and then written into the data memory. The data read from the data memory is decrypted by the data encryption and decryption module and then read to the data reading and writing interface module.

According to the storage data encryption and decryption apparatus and method provided in the present disclosure, the data memory is partitioned into a plurality of storage areas in the same chip. Each storage area uses a particular key respectively, and storage areas with the same address in different chips use different keys, which can ensure data security. In addition, when the system is subject to a data security attack, the keys in the key memory can be erased so that the encrypted data in the memory cannot be decrypted correctly and has a good anti-attack capability, and data storage, reading and writing operations can be implemented effectively.

The above descriptions are merely specific implementation manners of the present disclosure, but the protection scope of the present disclosure is not limited to this. Variations or replacements that can be easily thought of by any person skilled in the art within the technical scope disclosed in the present disclosure shall all be encompassed in the protection scope of the present disclosure. Therefore, the protection scope of the present disclosure should be subject to the protection scope of the claims.

The invention claimed is:

1. A method for encrypting and decrypting data, the method performed by an embedded system and comprising:
  generating, by a true random number generator of the embedded system, a plurality of keys, wherein:
    the plurality of keys comprise a first key and a second key,
    the first key is used to encrypt acquired data to be written to a first chip of the embedded system and to decrypt encrypted data read from the first chip, and
    the second key is used to encrypt acquired data to be written to a second chip of the embedded system and to decrypt encrypted data read from the second chip;
  writing the plurality of keys into a key memory of the embedded system; and
  performing, using the first key of the plurality of keys from the key memory, encryption operation on data to be written into a data memory of the first chip and decryption operation on data read from the data memory of the first chip.

2. The method according to claim 1, wherein generating the plurality of keys further comprises:
  determining whether data in the data memory is to be divided; and
  performing encryption and decryption operations in response to the determination.

3. The method of claim 2, wherein performing encryption and decryption operations in response to the determination comprises:
  in response to determining that the data in the data memory is to be divided:
  partitioning the data memory into a plurality of logical data storage areas; and
  performing encryption and decryption operations selectively on data of the plurality of logical data storage areas.

4. The method of claim 3, wherein performing the encryption and decryption operations selectively on data of the plurality of logical data storage areas use a third key for a first logical data storage area of the plurality of logical data storage areas and a fourth key for a second logical data storage of the plurality of logical data storage areas.

5. The method of claim 4, wherein the third key is different from the fourth key.

6. The method of claim 4, wherein the third key and the fourth key are different from another key associated with another data memory.

7. The method of claim 2, wherein performing encryption and decryption operations in response to the determination comprises:
  in response to determining that the data in the data memory is not to be divided, performing encryption and decryption operations on data of an entire data storage area.

8. The method according to claim 7, wherein performing the encryption and decryption operations on data of the entire data storage area uses a unified key for the entire data storage area.

9. The method according to claim 8, wherein the unified key for the entire data storage area is different from another key associated with another data memory.

10. The method according to claim 1, wherein performing the encryption and decryption operations uses a single-cycle encryption and decryption algorithm.

11. The method according to claim 10, wherein the encryption and decryption algorithm comprises one of exclusive OR encryption or sequence rearrangement.

12. The method according to claim 1, wherein the at least one key of the plurality of keys is acquired automatically by the key memory when the embedded system is started.

13. The method according to claim 1, wherein the data memory and the key memory are located on a same physical medium of the embedded system.

14. The method according to claim 1, further comprising clearing the plurality of keys stored in the key memory in response to a determination that the embedded system is being attacked.

15. An embedded system for encrypting and decrypting data, comprising:
  a true random number generator configured to generate a plurality of keys, wherein:
    the plurality of keys comprise a first key and a second key,
    the first key is used to encrypt acquired data to be written to a first chip of the embedded system and to decrypt encrypted data read from the first chip, and
    the second key is used to encrypt acquired data to be written to a second chip of the embedded system and to decrypt encrypted data read from the second chip;
  a memory bank comprising a key memory configured to store the plurality of keys; and
  a memory module configured to use the first key of the plurality of keys from the key memory to perform encryption operation on data to be written into a data memory of the first chip and decryption operations on data to be read from the data memory the first chip.

16. The system according to claim 15, wherein the memory module is further configured to:
  determine whether data in the data memory is to be divided; and
  perform encryption and decryption operations in response to the determination.

17. The system according to claim 16, wherein the memory module is further configured to:
  in response to determining that the data in the data memory is to be divided:
    partition the data memory into a plurality of logical data storage areas; and
    perform encryption and decryption operations selectively on data of the plurality of logical data storage areas.

18. The system according to claim 17, wherein the memory module is further configured to use a third key for a first logical data storage area of the plurality of logical data storage areas and a fourth key for a second logical data storage of the plurality of logical data storage areas.

19. The system according to claim 18, wherein the third key is different from the fourth key.

20. The system according to claim 18, wherein the third key and the fourth key are different from another key associated with another data memory.

21. The system according to claim 16, wherein the memory module is further configured to:
in response to determining that the data in the data memory is not to be divided, perform encryption and decryption operations on data of an entire data storage area.

22. The system according to claim 21, wherein the memory module is further configured to use a unified key for the entire data storage area.

23. The system according to claim 22, wherein the memory module is configured to use a single-cycle encryption and decryption algorithm for performing the encryption and decryption operations.

24. The system according to claim 23, wherein the encryption and decryption algorithm comprises one of exclusive OR encryption or sequence rearrangement.

25. The system according to claim 1, wherein the at least one key of the plurality of keys is acquired automatically by the key memory when the embedded system is started.

26. The system according to claim 1, wherein the data memory and the key memory are located on a same physical medium of the embedded system.

27. The system according to claim 1, wherein the memory module is further configured to clear the plurality of keys stored in the key memory in response to a determination that the embedded system is being attacked.

* * * * *